(12) United States Patent
Hahn et al.

(10) Patent No.: US 8,245,743 B2
(45) Date of Patent: Aug. 21, 2012

(54) RUBBER FORMULATION WITH ADHESIVE-COMPATIBLE SURFACE

(75) Inventors: Bruce Raymond Hahn, Hudson, OH (US); Peter Ross Shepler, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 781 days.

(21) Appl. No.: 12/329,192

(22) Filed: Dec. 5, 2008

(65) Prior Publication Data

US 2009/0078354 A1   Mar. 26, 2009

Related U.S. Application Data

(62) Division of application No. 11/280,490, filed on Nov. 16, 2005, now abandoned.

(51) Int. Cl.
*B60C 19/00* (2006.01)

(52) U.S. Cl. ............... 152/152.1; 152/510; 152/565; 524/111

(58) Field of Classification Search ............... 152/152.1, 152/510, 565; 524/238, 317, 318, 111
See application file for complete search history.

(56) References Cited

U.S. PATENT DOCUMENTS

| | | |
|---|---|---|
| 4,073,776 A | 2/1978 | Galkiewicz et al. |
| 4,104,218 A | 8/1978 | Hous |
| 4,130,519 A | 12/1978 | Roper et al. |
| 4,388,261 A | 6/1983 | Codispoti et al. |
| 4,452,960 A | 6/1984 | Throckmorton |
| 4,714,734 A | 12/1987 | Hashimoto et al. |
| 4,885,341 A | 12/1989 | Aonuma et al. |
| 5,021,522 A | 6/1991 | Durairaj et al. |
| 5,385,980 A | 1/1995 | Schaefer et al. |
| 5,500,065 A | 3/1996 | Koch et al. |
| 5,686,161 A | 11/1997 | Cullen et al. |
| 5,971,046 A | 10/1999 | Koch et al. |
| 6,093,271 A | 7/2000 | Majumdar |
| 6,220,326 B1 | 4/2001 | Blok et al. |
| 6,309,494 B1 | 10/2001 | Koch et al. |
| 6,444,069 B1 | 9/2002 | Koch et al. |
| 6,524,415 B1 | 2/2003 | Youngman et al. |
| 6,688,353 B1 | 2/2004 | Koch |
| 6,854,324 B2 | 2/2005 | Landes et al. |
| 2003/0205309 A1 | 11/2003 | Sandstrom |
| 2004/0140030 A1 | 7/2004 | Hahn et al. |
| 2005/0076992 A1 | 4/2005 | Metcalf et al. |

FOREIGN PATENT DOCUMENTS

| | | |
|---|---|---|
| EP | 0775719 A2 | 5/1997 |
| EP | 0941871 A2 | 9/1999 |
| EP | 1357147 A1 | 10/2003 |
| EP | 1439079 A2 | 7/2004 |
| EP | 1754750 A1 | 2/2007 |

OTHER PUBLICATIONS

Kent L. Chasey, Methods for Evaluating Oil/Polymer Interactions in Carbon Black Filled Compounds, 143rd Meeting, Spring 1993, Conference Proceedings, Denver, CO, May 18-21, 1993, Paper 55, pp. 34-012.

European Patent Office, European Search Report in European Patent Application No. 06123828.3, mailed Jan. 23, 2007, 7 pages.

European Patent Office, European Office Action in Application No. 06123828.3, Jun. 9, 2008, 5 pages.

*Primary Examiner* — Peter D Mulcahy

(74) *Attorney, Agent, or Firm* — Wood, Herron & Evans, LLP

(57) ABSTRACT

A method of effecting an improved adhesive bond between a rubber surface and a device adhered thereto is disclosed. In pneumatic tires, monitoring devices are more securely adhered to the innerliner of the tire utilizing a room temperature vulcanizable adhesive wherein curing is facilitated in the presence of moisture. The innerliner formulation is prepared by incorporating a material which has incomplete compatibility with the rubber of the innerliner formulation, and which has hygroscopic properties which thereby tends to attract moisture.

3 Claims, No Drawings

RUBBER FORMULATION WITH ADHESIVE-COMPATIBLE SURFACE

FIELD OF THE INVENTION

This application is a Divisional of U.S. patent application Ser. No. 11/280,490 filed Nov. 16, 2005, now abandoned the disclosure of which is hereby incorporated by reference herein.

BACKGROUND OF THE INVENTION

Pneumatic tires are conventionally of an open toroidal shape defining a cavity which is substantially enclosed by the tire, and the closure of the cavity is conventionally completed by mounting the tire on an intended rigid rim. The tire conventionally has a rubber innerliner which is co-existent with and is an exposed surface of the tire cavity. Such pneumatic tire configurations are conventional as would be understood by one having skill in such art.

Pneumatic tires usually rely upon air pressure to maintain their shape and associated performance during service conditions, although some pneumatic tires may be designed to hold their shape and provide representative performance, at least for limited times, even though they may have lost or are not able to maintain their internal air pressure for various reasons. For the purpose of the description of this invention, such tires are considered herein to be pneumatic tires even though they might be designed to run without an internal air pressure for limited periods of time.

For various applications, it may be desirable to provide a pneumatic rubber tire with a sensing device (e.g., transducer and associated microprocessor) on its inner surface which has a capability of transmitting various data relating to the tire such as, for example, its internal air pressure and temperature relative to an external transmitting and receiving device. This device may also have the capability of electronically receiving power generated from an electromagnetic wave generating source outside the tire.

Monitoring equipment is increasingly being used to measure the operating conditions under which pneumatic tires operate. Including but not limited to applications on truck, passenger and off the road (OTR) tires, the monitoring equipment allows for determination of operating tire pressure, temperature of the tire, and distance traveled by the tire, as measured by equipment measuring the number of revolutions of individual tires, among other parameters.

In connection with conducting such monitoring, it becomes important for the monitoring equipment to be installed onto the tire in such a manner that measurements will continue to be obtained over time, and that the monitoring equipment doesn't shift along the mating surface of the tire during operation, or become partially or completely disengaged from that mating surface. Generally, monitoring equipment is installed along the interior surface of the tire on the innerliner.

For example, it may be desirable to provide a tire with a suitable antenna as an actual part of the tire for both receiving various electromagnetic signals from an exterior source by an internal sensing device within the tire, such as a transducer, and for transmitting various electromagnetic signals from within the tire to an external receiving device. For the purposes of the description of this invention, such components which may include one or more of a transducer, associated dedicated integrated circuit microprocessor and other associated component(s), and particularly a transponder, are more simply collectively referred to herein as a microprocessor.

In particular, such antenna may be provided as at least one electrically conductive element. The antenna may be connected, for example, to the microprocessor either physically or inductively, and may be incorporated into an annular rubber strip. Such an annular rubber strip will contain at least one electrically conductive element basically extending substantially or entirely throughout its length (e.g., one or more electrically conductive metal wires) for its purpose and have suitable elastomeric properties for compatibility with the inner rubber surface of the tire.

It would be preferable for the antenna and microprocessor to be incorporated into the tire during the tire building process, to thus securely position the individual devices within the built tire between layers of rubber. The stresses imposed on the devices during the tire building process, however, typically require that the antenna and microprocessor, and similar sensitive devices, be installed after the tire has been fabricated and cured.

During the tire fabrication process, various materials are used in fabricating the tire, such as processing oils, waxes and the like. These materials, incorporated as a part of the green tire, thereafter can interfere with the subsequent procedure of firmly adhering the antenna and microprocessor to a portion of the innerliner. The innerliner surface can be cleaned of such potentially interfering materials by various processes, but the cleaning involves additional time and cost with the prospect for varying results.

Thus, there remains a continuing need to effect a more secure adhesive bond between a surface of the antenna and microprocessor on the one hand, and the innerliner surface of the tire on the other, to thereby minimize the risk of delamination during operation of the tire.

SUMMARY OF THE INVENTION

The invention relates to a method of effecting an adhesive bond between the mating surfaces of an innerliner and an antenna, a microprocessor, or both, by incorporating an additive into the innerliner rubber formulation, the additive having a solubility parameter in the range of 8.5 to 10.5 $cal^{1/2}$ $cm^{3/2}$ $mol^{-1}$, the additive exhibiting a level of hygroscopicity. Thereafter, the rubber surface containing the additive is brought into contact with an adhesive, and the microprocessor, antenna, or both, is then positioned onto the adhesive. This additive, after incorporation into the innerliner, and after fabrication of a cured pneumatic tire, is present on the exposed surface of the innerliner and further exhibits moisture acquiring, or hygroscopic, properties. These hygroscopic properties tend to facilitate collection of moisture at the innerliner surface, and thereby promote the formation of an adhesive bond between the exposed surface of the innerliner and an RTV (room temperature vulcanizable) adhesive composition used to affix, for example, an antenna and microprocessor, or multiple such antennas and microprocessors, to the innerliner surface. Alternatively, the additive is incorporated into a formulation which is used to manufacture a rubber strip. This strip is then applied to an exposed, mating surface of the innerliner prior to curing. The microprocessor, antenna, or both, can then be positioned over the rubber strip, previously treated with adhesive, and then brought into mating contact with the adhesive.

The hygroscopic effect of the incompletely compatible component incorporated into the innerliner rubber composition assists in improving the strength of the bond developed between the innerliner surface and the RTV adhesive composition. This hygroscopic effect observed at the exposed surface of the innerliner renders less critical a thorough cleaning of that part of the innerliner surface which is to receive the adhesive composition. Thus, silicone release agents, for example, along the exposed innerliner surface do not necessarily have to be completely removed for a strong adhesive bond to be created between the innerliner surface and a mating surface of the antenna and microprocessor following dispensing of an RTV adhesive. The adhesive having the characteristics of curing more readily in the presence of moisture, and at room temperature, can be hydroxyl terminated organosiloxane compositions of the type described in U.S. published patent application US 2004/0140030 A1, incorporated herein by reference in its entirety, urethane-based with silane type end groups, and similar functioning adhesive compositions.

As measured in Newtons, the degree of strength of the adhesive bond created at the surface of the innerliner incorporating the incompletely compatible component is markedly improved relative to a comparison surface which does not contain this component.

Thus, an adhesive bond resistant to delamination can be implemented to secure one or more microprocessors and antennas to the innerliner layer of a pneumatic tire using room temperature vulcanizable silicone adhesives by introducing a modifying additive into the rubber formulation used in preparing the innerliner layer which makes contact with the adhesive. Moisture facilitates the vulcanization reaction of the room temperature vulcanizable (RTV) adhesive. The diffusion of moisture into the RTV adhesive controls the rate of cure, in combination with the nature of the protecting group on the adhesive.

The additives which are to be incorporated into the innerliner rubber formulation are comprised of molecules which have the ability to attract and weakly bond with water molecules through hydrogen bonding or other weak chemical interactions. Another feature of these additives is the degree of solubility the additive molecules have in the rubber formulation, which can be used in preparing an innerliner. Generally, the additive molecule has a solubility characteristic relative to the innerliner rubber formulation which tends to concentrate the additive molecules on the surface of the innerliner, but not so much as to migrate sufficiently to bloom on the rubber innerliner surface. Additive bloom would create a layer on the rubber innerliner surface which would thereby prevent good adhesive formation.

The solubility parameters for the additives in this invention will range from 8.5 to 10.5 $cal^{1/2}$ $cm^{3/2}$ $mol^{-1}$. Generally, tire elastomers have solubility parameters ranging from about 8.0 to 8.5 $cal^{1/2}$ $cm^{3/2}$ $mol^{-1}$. Additives with solubility parameters above 10.5 $cal^{1/2}$ $cm^{3/2}$ $mol^{-1}$ will be expected to completely migrate to the rubber surface and thereby create a weak layer causing poor adhesion. Additives with solubility parameters from 8 to 8.5 $cal^{1/2}$ $cm^{3/2}$ $mol^{-1}$ will remain completely soluble within the rubber matrix and will not enhance the hygroscopic characteristics of the innerliner rubber surface. Additives with solubility parameters below 8.0 will be nonpolar, hydrophobic in nature and will not enhance the hygroscopic characteristics of the innerliner surface. Further parameter data on various materials can be found in the Handbook of Solubility Parameters and Other Adhesion Parameters, Allan F.M. Barton, CRC Press (2d ed., 1991).

The features and objectives of the present invention will become more readily apparent from the following Detailed Description.

DETAILED DESCRIPTION OF THE INVENTION

More broadly, the invention relates to a method of effecting an adhesive bond between a rubber surface of a rubber material and an RTV adhesive, the rubber material comprising a rubber selected from the group consisting of homopolymers and copolymers of at least one of isoprene and 1,3-butadiene and copolymers of at least one of isoprene and 1,3-butadiene with styrene; isobutylene-based rubbers as copolymers of isobutylene and from about 2 to about 8 weight percent units derived from isoprene and such isobutylene-based copolymers halogenated with chlorine or bromine and mixtures thereof; and a rubber additive having a solubility parameter from 8.5 to 10.5 $cal^{1/2}$ $cm^{3/2}$ $mol^{-1}$, the additive further having hygroscopic properties. As used herein, hygroscopic is meant to encompass the ability to form chemical bonds or chemical interactions with water. A hygroscopic material readily absorbs moisture, as from the atmosphere. Good results have been obtained wherein the rubber additive is selected from the group consisting of sorbitan fatty acid esters and phenol formaldehyde resins containing hydroxyl/hydrogen groups. The rubber additive for the formulation can be incorporated into the rubber component at a concentration of from 0.5 to 6.0 phr, more particularly 1.0 to 5.0 phr and most particularly 2.0 to 4.0 phr. The formulation can be used in connection with the fabrication of an innerliner, used in turn in manufacturing a pneumatic tire. Alternatively, the additive is incorporated into a formulation which is used to manufacture a rubber strip. This strip is then applied to an exposed, mating surface of the innerliner prior to curing. The microprocessor, antenna, or both, can then be positioned over the rubber strip, previously treated with adhesive, and then brought into mating contact with the adhesive.

When used in making an innerliner layer, the rubber additive incorporated into the formulation for producing the rubber material tends to concentrate at the exterior surface of the compounded, cured innerliner layer. Other processing materials which have been incorporated into the innerliner formulation or onto the innerliner surface, such as but not limited to silicone release agents, antioxidants, waxes, and processing oils, may also be present on the surface of the cured innerliner layer in varying concentrations. Under these processing conditions, it typically becomes more difficult for any antenna or microprocessor to be satisfactorily adhered to this surface of the innerliner using an adhesive, due to the presence of materials on the rubber surface which interfere with the adhesion process. The rubber additive having hygroscopic properties and incomplete solubility in the innerliner rubber formulation facilitates the curing mechanism of room temperature vulcanizable (RTV) adhesives, even in the presence of potentially interfering materials on the surface of the innerliner layer such as the above-mentioned processing aids, and the like.

Room temperature vulcanizable adhesives which will generate an advantageous adhesive bond to the surface of the innerliner containing the rubber additive are selected generally from the class of siloxane adhesives, described in more detail in U.S. published patent application US 2004/0140030 A1, which is incorporated herein by reference in its entirety. Also, urethane adhesives with silane type end groups, which operate under similar conditions of room temperature vulcanization in the presence of moisture such as that provided by atmospheric humidity, can be employed with good effect.

The material incorporated into the formulation used to manufacture the rubber material to which the adhesive makes contact, has a solubility parameter in the range of 8.5 to 10.5 $cal^{1/2}$ $cm^{3/2}$ $mol^{-1}$. Further, this material contains chemical groups able to attract and weakly bond with water molecules, either through hydrogen bonding or other weak chemical interaction. Such bonding or interaction capacity can be found, for example, in molecules having end groups such as —OH, —OOH, —NH, —NH2, and combinations thereof. Specific examples of operative materials are esters such as sorbitan monostearate and formaldehyde resins such as octylphenol formaldehyde resin.

The following examples demonstrate the moisture-absorbing, and thereby the adhesion-facilitating function of the rubber additive described herein which has been incorporated into a rubber innerliner formulation.

The formulations for evaluating the adhesion-facilitating rubber additive are set out below in Tables 1 and 2. The formulations are divided into first, non-productive mixes and second, productive mixes. All component concentrations are referenced on a weight basis to parts per hundred rubber (phr). The rubber additive evaluated in the Table 1 formulation was octylphenol formaldehyde resin, having a solubility parameter of 10.1 $cal^{1/2}$ $cm^{3/2}$ $mol^{-1}$ from Lonza Inc., Allendale, N.Y. The rubber additive evaluated in the Table 2 formulation was sorbitan monostearate having a solubility parameter of 9.41 $cal^{1/2}$ $cm^{3/2}$ $mol^{-1}$ from Schenectady International, Schenectady, N.Y.

TABLE 1

Formula I

| Component | Control | With Additive |
|---|---|---|
| First Mix - Non-Productive | | |
| Bromobutyl Rubber1 | 100 | 100 |
| Carbon Black2 | 60 | 60 |
| Rosin Oil | 2 | 2 |
| Medium Naphthenic Process Oil3 | 3 | 3 |
| Stearic Acid | 0.5 | 0.5 |
| Mixture of Alkylated Naphthenic and Aromatic Resins | 10 | 10 |
| Second Mix - Productive | | |
| Sulfenamide and Thiuram Type Accelerator | 1.5 | 1.5 |
| Zinc Oxide | 1 | 1 |
| Magnesium Oxide | 0.1 | 0.1 |
| Octylphenol Formaldehyde Resin4 | 0 | 3 |
| Sulfur | 0.5 | 0.5 |
| TOTAL | 178.6 | 181.6 |

1Bromobutyl 2222, from ExxonMobil
2N660
3Flexon 641, from ExxonMobil
4SR1068, Schenectady International

TABLE 2

Formula II

| Component | Control | With Additive |
|---|---|---|
| First Mix - Non-Productive | | |
| Natural Rubber | 52.5 | 52.5 |
| Cis-polybutadiene1 | 10 | 10 |
| Emulsion SBR (23% styrene)2 | 37.5 | 37.5 |
| Carbon Black3 | 62 | 62 |
| Medium Naphthenic Process Oil4 | 8 | 8 |
| Stearic Acid | 1 | 1 |
| Mixture of Alkylated Naphthenic and Aromatic Resins | 6 | 6 |
| Second Mix - Productive | | |
| Sulfenamide and Thiuram Type Accelerator | 1 | 1 |
| Zinc Oxide | 5 | 5 |
| Magnesium Oxide | 0.1 | 0.1 |

TABLE 2-continued

Formula II

| Component | Control | With Additive |
|---|---|---|
| Sorbitan Monostearate5 | 0 | 3 |
| Sulfur | 0.5 | 0.5 |
| TOTAL | 183.6 | 186.6 |

1Budene 1208, from the Goodyear Tire & Rubber Company
2The Goodyear Tire & Rubber Company
3N660
4Flexon 641, from ExxonMobil
5Lonzest SMS, Lonza Inc.

The four rubber samples prepared according to the formulations set out above in Tables 1 and 2 were processed and cured. Adhesion testing was conducted utilizing a modified T-Peel test, ASTM D-1876. The adhesive was applied to a ½ inch rubber strip which was then applied to a second ½ inch rubber strip. The adhesive was permitted to dry for 24 hours in testing samples made from the Table 1 formulas. Adhesive drying times for samples made from the Table 2 formulas varied, and are set out for different samples in Table 4. Adhesion strength obtained with the various samples was evaluated using the T-Peel test, which was used to separate the two adhesively bonded rubber strips and analyze the force required to effect the separation. The average force in Newtons used to pull the strips apart was measured using a UTS tensile testing machine.

To prepare individual rubber samples for this test, the rubber formulas from Table 1 both with and without the modifying additive were compounded, cured and then aged 24 hours in a 90% relative humidity atmosphere. Adhesive was then applied and the adhesive strength in Newtons was measured after 24 hours of adhesive drying time following bonding of the two rubber strips. Samples from the rubber formulas from Table 2 both with and without the additive were also compounded, cured and aged 24 hours in a 90% relative humidity atmosphere. Adhesive was then applied between the two rubber strips, and the adhesive strength in Newtons was measured at the adhesive drying times following bonding, as specified in Table 4.

The adhesion (in Newtons) obtained utilizing an RTV silicone adhesive, Loctite 5900, Loctite Corporation, Rocky Hill, Conn., to bond two rubber strips made from the rubber formulation incorporating the octylphenol formaldehyde resin in Formula I compared to the bonded rubber strips made from the control formulation without octylphenol formaldehyde resin is shown below in Table 3.

TABLE 3

Adhesion: T-Peel Test

| Formula I Control (Without Resin) | Formula I (With Phenol Formaldehyde Resin) |
|---|---|
| 33 Newtons | 79 Newtons |

The improvements in adhesion obtained over time with Formula II containing the sorbitan monostearate additive relative to the control is shown in Table 4 below.

TABLE 4

Adhesion: T-Peel Test

| Adhesive Drying Time | Formula II Control | Formula II (With Sorbitan Monostearate) |
|---|---|---|
| 60 min. | 0.69 Newtons | 3.73 Newtons |
| 240 min. | 1.79 Newtons | 17.86 Newtons |
| 450 min. | 1.43 Newtons | 32.02 Newtons |
| 1400 min. | 1.24 Newtons | 90.29 Newtons |

The Table 3 results demonstrate a substantial improvement in adhesion using the rubber strips containing the octylphenol formaldehyde resin relative to the control. As can be seen from the results in Table 4, the additive-containing formula retained increased moisture at the surface of the rubber, which led to both a faster increase in adhesive strength (in Newtons) as the adhesive drying times increased, as well as a higher final cured adhesion strength, indicating that both the cure rate of the adhesive and the bonding strength at the rubber substrate are enhanced by using a moisture attracting additive in the rubber compound.

Thus, sensing devices such as the microprocessors and antennas described herein can be bonded using an RTV adhesive at higher adhesive strength levels onto a rubber surface, such as that of an innerliner, fabricated with one or more of the rubber additives described herein.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative methods and illustrative examples shown and described. Accordingly, departures may be made from such details without departing from the scope or spirit of applicant's general inventive concept.

What is claimed is:

1. A tire comprising:
  an innerliner comprising a first rubber material having a first rubber surface;
  a strip material comprising a second rubber material having a second rubber surface, the first or the second rubber material including a rubber selected from the group consisting of homopolymers and copolymers of at least one of isoprene and 1,3-butadiene and copolymers of at least one of isoprene and 1,3-butadiene with styrene, a halogenated isobutylene-based copolymer with from about 2 to about 8 weight percent units derived from isoprene, and mixtures thereof, and
  sorbitan monostearate; and
  an adhesive that is situated between and in direct contact with the first and the second rubber surfaces of the first and the second rubber materials, the adhesive being vulcanizable at room temperature in the presence of moisture and selected from the group consisting of a urethane adhesive with silane type end groups, a hydroxyl terminated organosiloxane adhesive, and mixtures thereof.

2. The tire of claim 1 further including a microprocessor, an antenna, or both positioned onto the adhesive opposite an area of contact between the adhesive and the second rubber surface.

3. The tire of claim 1 wherein the adhesive is a hydroxyl terminated organosiloxane adhesive.

\* \* \* \* \*